Figure 1:
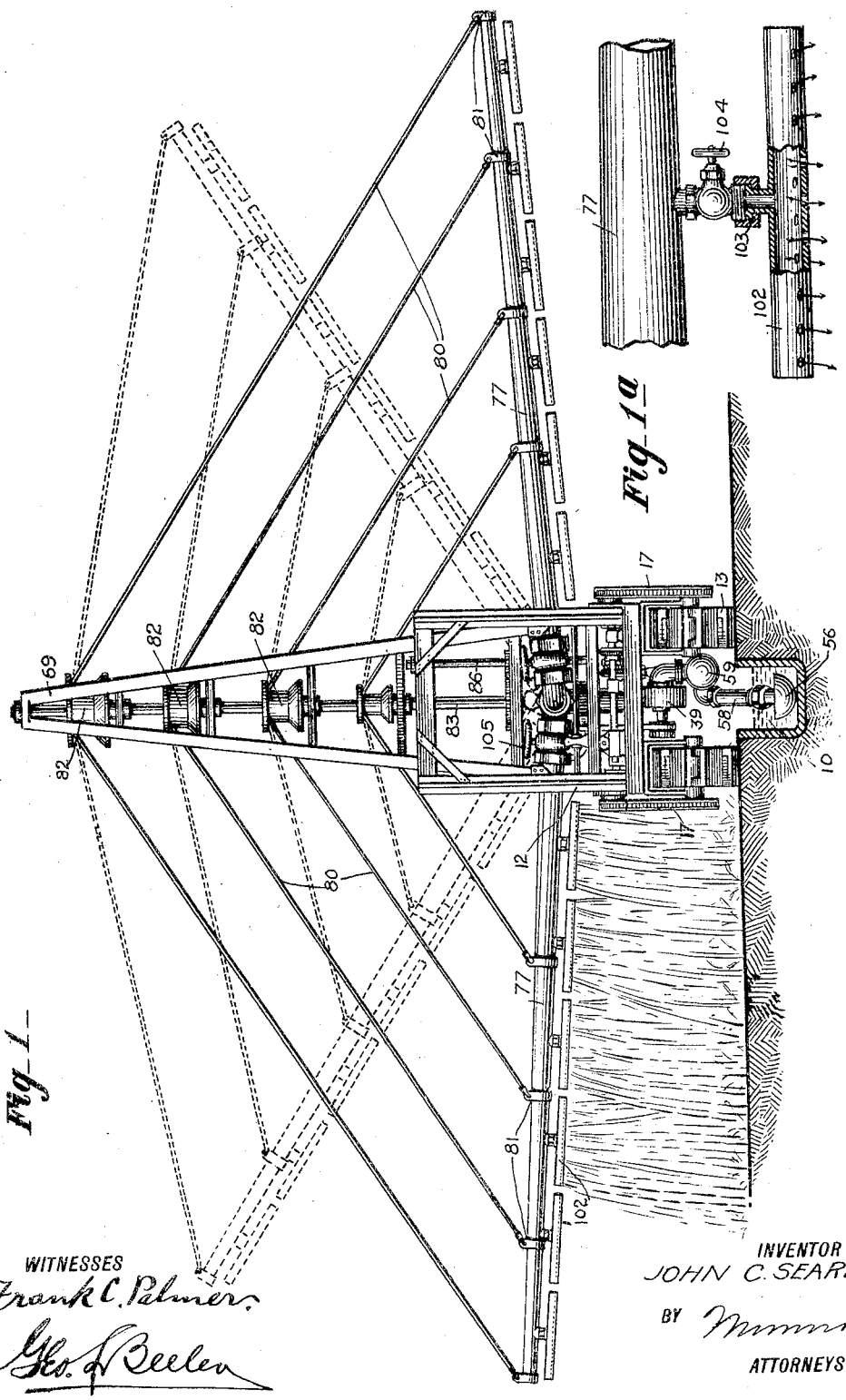

J. C. SEARLE.
TRAVELING IRRIGATOR.
APPLICATION FILED AUG. 7, 1913.

1,107,119.

Patented Aug. 11, 1914.
5 SHEETS—SHEET 3.

WITNESSES
Frank C. Palmer
Geo. L. Beeler

INVENTOR
JOHN C. SEARLE
BY Munn & Co
ATTORNEYS

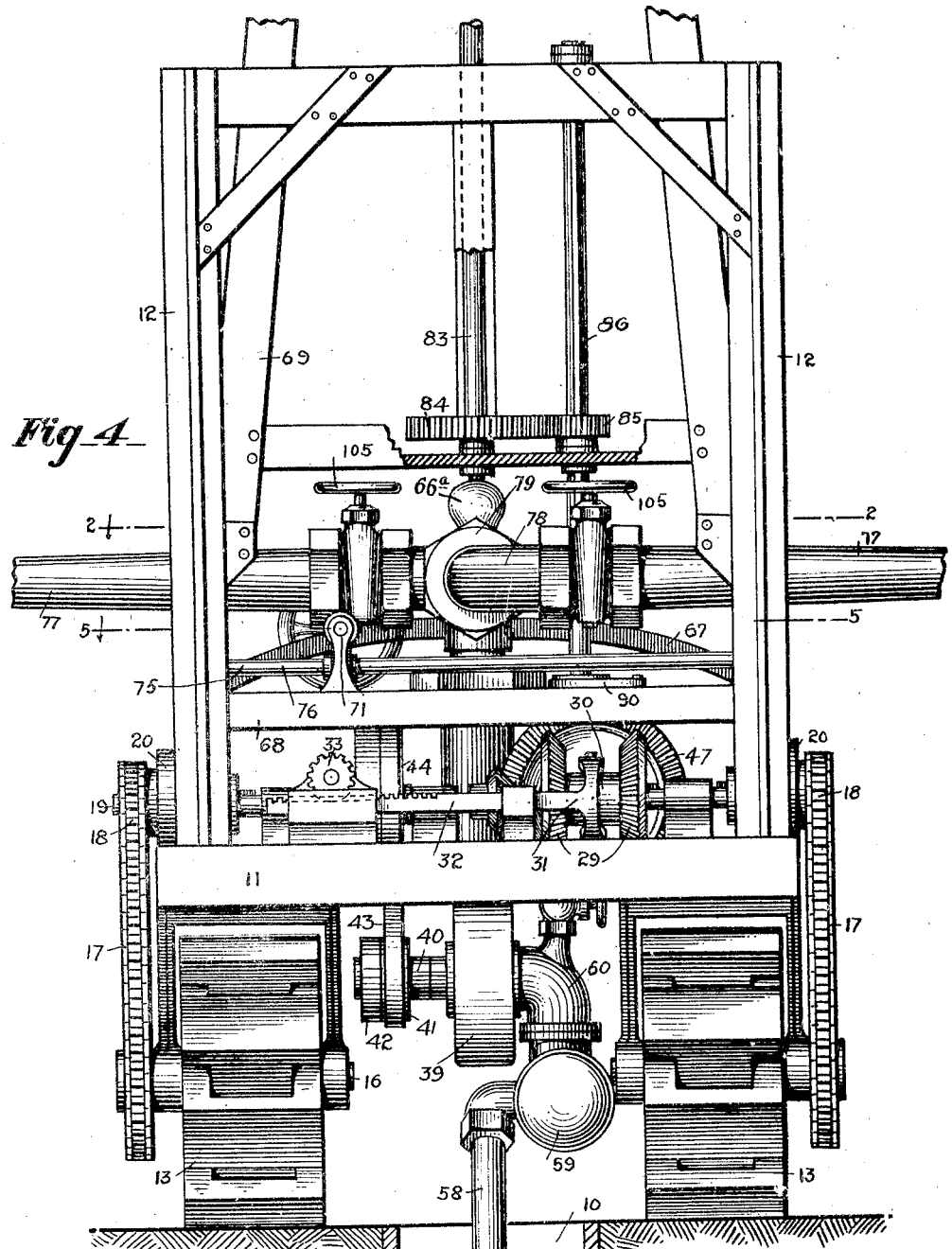

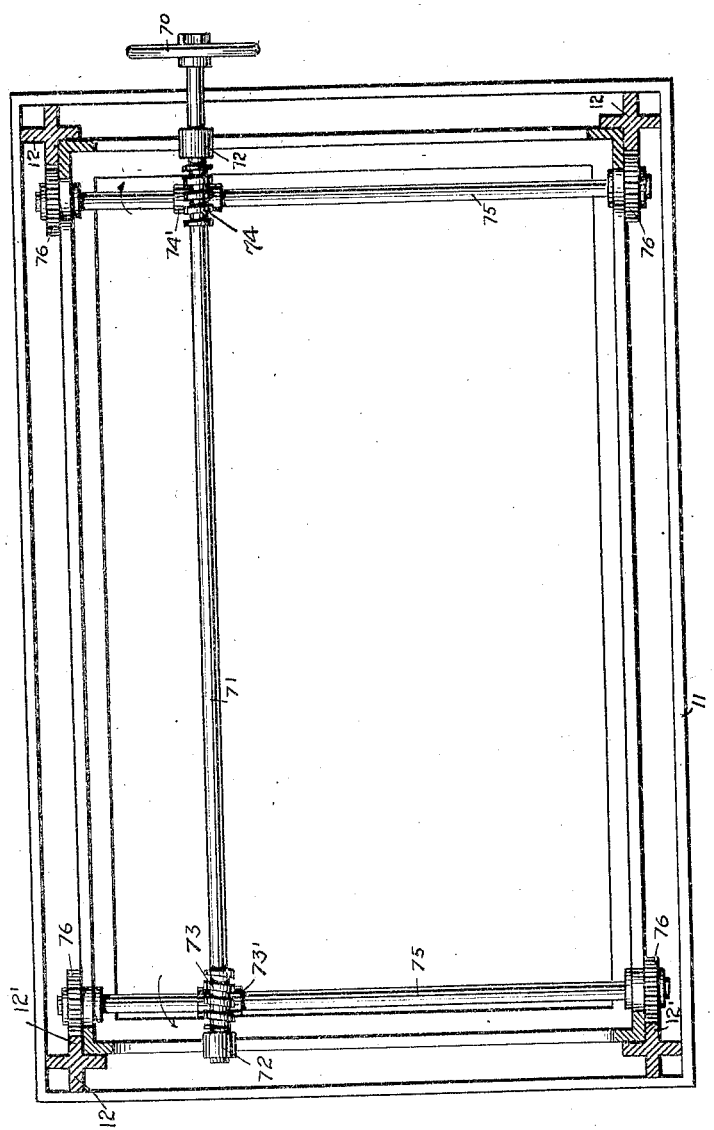

UNITED STATES PATENT OFFICE.

JOHN COOPER SEARLE, OF LALAMILO, TERRITORY OF HAWAII.

TRAVELING IRRIGATOR.

1,107,119.        Specification of Letters Patent.     Patented Aug. 11, 1914.

Application filed August 7, 1913. Serial No. 783,605.

*To all whom it may concern:*

Be it known that I, JOHN C. SEARLE, a citizen of the United States, and a resident of Lalamilo, in the county of Hawaii, Territory of Hawaii, have invented a new and Improved Traveling Irrigator, of which the following is a full, clear, and exact description.

This invention relates to water distribution and has particular reference to irrigating devices.

Among the primary objects of this invention is to provide a machine, preferably of a self-propelled nature, which is adapted to draw or receive water from a ditch while progressing along or over the same, the machine being provided with pumps or other suitable machinery whereby the water will be elevated and distributed over a wide portion of land on either or both sides of the machine while in transit.

The invention also includes a number of valuable details of construction which will render the machine reliable and efficient in practical operation.

The foregoing and other objects of the invention will hereinafter be more fully described and claimed and illustrated in the drawings forming a part of this specification in which like characters of reference indicate corresponding parts in all the views, and in which—

Figure 2:
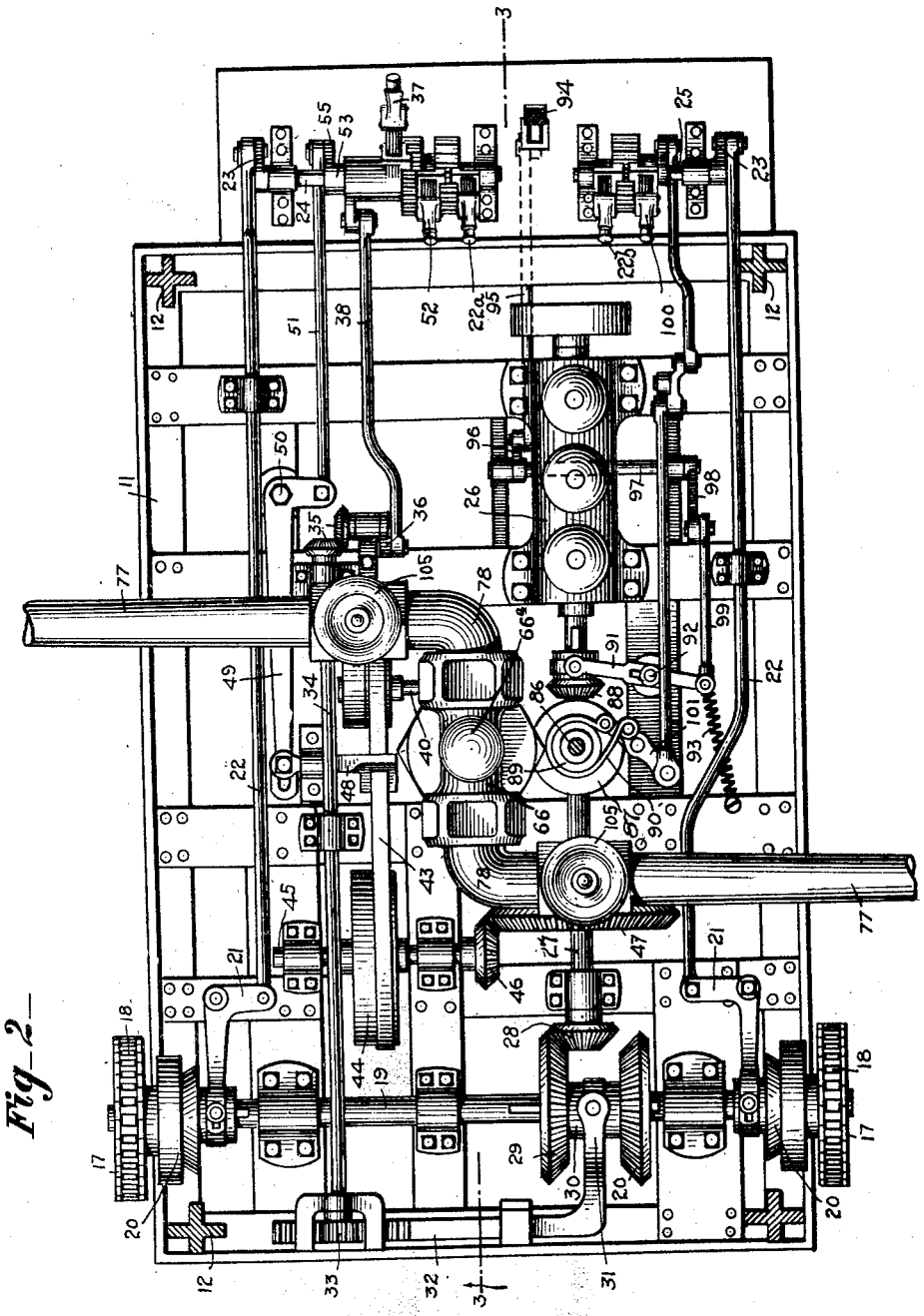
Figure 3:
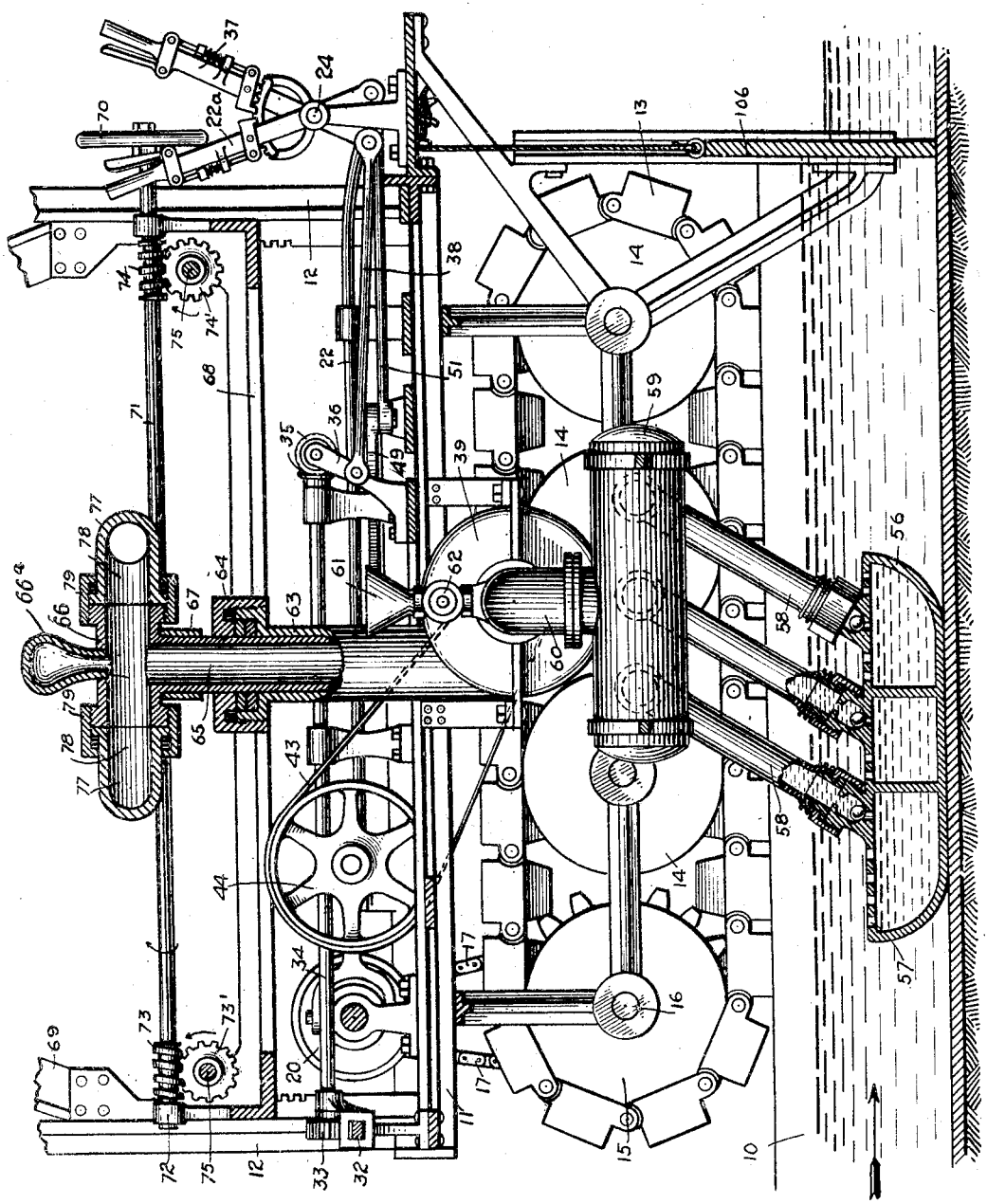

Figure 1 is a rear elevation of the machine in operative position; Fig. 1ª is a detail of one of the sprinkling nozzles; Fig. 2 is a plan view, partly in section, substantially on the line 2—2 of Fig. 4, the tower portion, however, not being shown; Fig. 3 is a vertical section on the line 3—3 of Fig. 2; Fig. 4 is a rear elevation of the main portion of the machine; and Fig. 5 is a sectional view on the line 5—5 of Fig. 4, showing the tower in its relation to the main frame and the manner of adjusting it vertically.

The several parts of the device may be made of any suitable materials, and the relative sizes and proportions and various details of construction may be varied to a considerable extent without departing from the spirit of the invention hereinafter more fully described and claimed.

In carrying out this invention in a practical embodiment, I provide any suitable number of ditches 10 having a substantially level contour which will receive water from any suitable source of supply. My machine is adapted to be drawn or propelled alongside of or astride of this ditch or the several ditches in turn so as to receive the water therefrom and distribute it.

The machine comprises any suitable form of main frame 11 having upright corner pieces 12 and supported upon suitable traction devices herein shown as of the caterpillar type including an endless traction belt 13 on each side. Each belt is supported upon a series of rollers 14 and 15, the latter being the driving sprocket for the belts. Each wheel 15 is mounted upon a driving axle 16 to which is connected a chain 17 operating over a driving pinion 18 adapted to be clutched to the end of a driving shaft 19 by means of a clutch 20. The clutches 20 are adapted to be operated independently of each other by means of any suitable mechanism herein illustrated as including a bell crank 21 and a connecting rod 22. The front ends of said rods are connected to bell cranks 23 mounted upon rock shafts 24 and 25 adjacent the front end of the machine and said rock shafts are controlled by hand levers 22ª and 22ᵇ within easy reach of the operator. By operating these levers in controlling the clutches independently of each other, the machine may be steered by causing one of the traction belts to operate faster than the other. The caterpillar type of traction devices is employed preferably because of the facility with which it may pass over loose or wet soil without excessive danger of damaging the roadway or the construction of the ditch.

At 26 I show a suitable type of motor which may be used not only to propel the machine but also to operate the pumps and other operating devices. The main rotary shaft 27 extends rearwardly from the motor and is provided on its rear end with a beveled pinion 28 adapted to mesh with either of the gears 29 connected to a sleeve 30 splined to the driven shaft 19. The space between said gears 29 is also sufficient for them to be held in neutral position with the pinion 28 out of mesh with both of them. The sleeve and attached gears are shiftable along the shaft 19 by means of a yoke 31 to which is connected a rack 32 in mesh with a pinion 33 connected to a shaft 34. At the front end of said shaft are arranged miter gears 35 one of which is connected to a rock shaft having a crank 36 connected to a control lever 37 by means of a rod 38. Said lever 37 is preferably journaled upon the aforesaid rock shaft 24 and also within easy reach of the operator. By means of the lever 37 the operator may shift the gears 29 so as to cause the machine to be propelled either forwardly or rearwardly or be held stationary, without interfering with the operation of the motor.

At 39 I show any suitable form of power pump, the drawings indicating a centrifugal pump mounted upon a shaft 40 to which are connected fixed and loose pulleys 41 and 42. A belt 43 driven from a pulley 44 is adapted to operate over said pulleys and through the fixed pulley 41 and drive the pump at high speed. The pulley 44 is connected to a shaft 45 to which is connected a bevel gear 46 driven from a corresponding gear 47 secured to the engine shaft 27. The pulley 44 and belt 43, therefore, will be operated whenever the engine shaft is rotated, and if the operator desires the pump to be put in motion he will shift the belt 43 from the loose pulley 42 to the fixed pulley 41. Any suitable means may be employed to effect such shifting of the belt. I show for this purpose a yoke 48 connected to a bell crank 49 pivoted at 50 to the main frame. To the other end of said bell crank is connected a rod 51 adapted to be reciprocated by means of a hand lever 52 connected to a sleeve 53 mounted upon the rock shaft 24 and provided with a crank 55 to which said rod 51 is connected.

Any suitable connections may be employed for the purpose of drawing the water from the ditch and delivering it into and through the pump 39. As an illustration of suitable means I show a shoe 56 adapted to glide along the bottom of the ditch and receive water into its interior through a series of holes 57 at its top, and the water may be drawn from the interior of the shoe through any suitable number of flexible arms or hose connections 58 leading up to a head 59 suitably supported upon the frame and in communication with the pump through a neck 60. The pump may be provided with a funnel 61 controlled by a valve 62 for the purpose of priming it. The discharge pipe 63 for the pump leads preferably vertically and has at its upper end a stuffing box 64 providing slidable connection with a vertically moving pipe 65 having at its upper end a T-head 66. Said T-head is maintained in any suitable elevated position by means of a bridge 67 connected to a vertically adjustable tower including a base 68 and uprights 69, and has a pressure dome 66ᵃ at its top.

The elevation of the tower may be performed or controlled by means of a hand wheel 70 connected to a shaft 71 journaled in bearings 72 in said base 68 and having a pair of worms 73 and 74 secured adjacent its ends and meshing with worm wheels 73′ and 74′ respectively. Said worm wheels are mounted upon transverse horizontal shafts 75 having pinions 76 at their ends adapted to mesh with and operate along rack teeth 12′ formed on the uprights 12 of the main frame. The hand wheel 70 is within easy reach of the operator and when turned in either direction the elevator will be caused to be lifted or lowered accordingly. When, however, the hand wheel is left in idle position, the worms 73 and 74 will hold the worm wheels 73′ and 74′ from rotating and hence will insure that the elevator will be maintained in any desired position.

I provide any suitable number of tubular arms 77 shown herein as two in number and connected at their inner ends to said T-head 66 of the vertically movable pipe connection. Each of said arms 77 has an elbow 78 at its inner end having swiveled connection by means of a stuffing box 79 with said T-head. This provides for the vertically swinging movement of the arms 77 as suggested in dotted lines in Fig. 1, which may be desirable in many cases as, for instance, when operating along hillsides or for turning or transportation purposes. Each of these arms 77 is preferably tapered so as to make its outer end lighter in proportion to its inner end and also to provide that a substantially even distribution of water may be had throughout the entire length of the arm. A series of guys 80 are connected to the arms at intervals by means of collars 81 and the upper or inner ends of said guys are connected to a series of drums 82 or to a single drum having sections of different diameters all of said drums being connected to a vertical shaft 83 suitably journaled in said tower 69. The shaft 83 is rotated by means of a gear 84 in mesh with a pinion 85 splined to a vertical power shaft 86. The shaft 83 together with its pawl 84 and the pinion 85 is movable with the tower, while the shaft 86 is stationary with reference to said tower. To the lower end of said shaft 86 is connected a gear 87 adapted to be driven by a pinion 88 slidable along the engine shaft 27. The gear 87 has associated with it a brake drum 89 fitted with a strap brake 90. The pinion 88 is shiftable along the shaft by means of a lever 91 pivoted at 92 and held normally out of gear by means of a spring 93. A foot lever 94 at the front end of the machine has connected to it a rod 95 connected at its other end to a crank 96 to one end of a rock shaft 97. The other end of the rock shaft has a crank 98 and between the latter crank and the lever 91 is a connecting rod 99 whereby, when the operator applies his foot to the foot piece 94, the pinion 88 may be thrown into gear for the purpose of rotating the shaft 86 and winding up the guys 80 with a corresponding hoisting of the arms 77. The arms may be retained in elevated position by means of the brake 90 controlled by a hand lever 100 having any suitable crank and rod connections with the brake lever 101.

Nozzles 102 are arranged along the bottoms of the arms 77 throughout their length and each of the nozzles is preferably swiveled at 103 to its arm, and the flow of water therethrough may be controlled or shut off by means of a valve 104. I may also provide a main valve 105 adjacent the elbow 78 of each arm so as to stop the flow of water therethrough. If the valve be closed while the arm is full of water, the weight of such water will counterbalance the weight of the water in the opposite arm while in operation.

At 106 I show an apron or movable dam which may be carried by the machine for the purpose of controlling the flow of water along the ditch. Said apron is preferably mounted so as to be carried by the frame 11 of the machine. The flow of water in the ditch is to be understood as being in the direction in which the machine is moving, whereby the dam 106 located at any convenient point will, in case the flow be more rapid than the movement of the machine, serve to dam up the water and thereby insure a sufficient supply for the intake shoe 56.

Having thus described my invention, I claim as new and desire to secure by Letters Patent:—

1. In an irrigating device, the combination of a main frame, means to support and propel the same, a tower, means to support and elevate the tower along the main frame, a plurality of laterally extending distributing arms supported by the tower, means to elevate the outer ends of the arms, said elevating means including a plurality of drum sections of different diameters carried by the tower and guys extending from said sections to different parts of said arms, and means to draw water from the ditch and deliver it to and through said distributing arms.

2. In a traveling irrigator, the combination of a main frame, means to support and propel the same along a ditch, a pump carried by the main frame, a shoe adapted to travel in the ditch, said shoe having a perforated top, flexible connections between the shoe and the pump, said pump having a vertical discharge pipe, a vertical delivery pipe telescopically connected to said discharge pipe and having at its upper end a horizontal longitudinally extending T-head, a pair of laterally extending distributing arms swiveled on the same axis to the opposite ends of said head, and means to swing said arms vertically around the axis of said swivels.

3. In an irrigating machine, the combination of a traveling frame, power devices carried by said frame, a pump operated by said power devices, a head 59 communicating with said pump, a shoe 56 adapted to trail beneath said frame, said shoe having a plurality of compartments, and a series of flexible connections leading from the several compartments of the shoe into said head.

4. In an irrigating machine of the kind set forth, the combination of a traction device, a pump carried by said device, means to operate the pump, a telescopic pipe leading upwardly from said pump, a horizontal T-head provided at the upper end of said telescopic pipe and having its alined terminals disposed longitudinally of the traction device, a pair of hollow arms having elbows swiveled to the front and rear ends of said T-head so as to receive water from the telescopic pipe, said arms being adjustable in spaced parallel vertical planes around the longitudinal axis of said head, and a pressure dome associated with said T-head.

In testimony whereof I have signed my name to this specification in the presence of two subscribing witnesses.

JOHN COOPER SEARLE.

Witnesses:
J. K. CLARKE,
GEO. McCORRISTON.

---

Copies of this patent may be obtained for five cents each, by addressing the "Commissioner of Patents, Washington, D. C."